US012222849B2

(12) United States Patent
Krishnamoorthy et al.

(10) Patent No.: US 12,222,849 B2
(45) Date of Patent: Feb. 11, 2025

(54) INFRASTRUCTURE REFACTORING VIA FUZZY UPSIDE DOWN REINFORCEMENT LEARNING

(71) Applicant: Bank of America Corporation, Charlotte, NC (US)

(72) Inventors: Madhu Sudhanan Krishnamoorthy, Tamil Nadu (IN); Sreeram Raghavan, Tamil Nadu (IN); Rajarajan Pandiyan, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 955 days.

(21) Appl. No.: 17/246,801

(22) Filed: May 3, 2021

(65) Prior Publication Data
US 2022/0350732 A1  Nov. 3, 2022

(51) Int. Cl.
*G06N 20/00* (2019.01)
*G06F 11/34* (2006.01)
*G06F 11/36* (2006.01)
*G06F 16/23* (2019.01)
*G06N 5/02* (2023.01)
*G06N 5/048* (2023.01)

(52) U.S. Cl.
CPC ...... *G06F 11/3688* (2013.01); *G06F 11/3457* (2013.01); *G06F 11/3616* (2013.01); *G06F 11/3664* (2013.01); *G06F 16/2379* (2019.01); *G06N 5/02* (2013.01); *G06N 20/00* (2019.01); *G06N 5/048* (2013.01)

(58) Field of Classification Search
CPC ... G06F 11/3457; G06F 11/3616; G06N 5/02; G06N 20/00; G06N 5/048
See application file for complete search history.

(56) References Cited

U.S. PATENT DOCUMENTS

| 2020/0159648 | A1* | 5/2020 | Ghare | G06F 9/4411 |
| 2021/0049006 | A1* | 2/2021 | Tommasi | G06F 9/44505 |
| 2021/0089966 | A1* | 3/2021 | Schmidhuber | G06N 3/044 |

OTHER PUBLICATIONS

Joseph et al ("Fuzzy Reinforcement Learning based Microservice Allocation in Cloud Computing Environments" 2019) (Year: 2019).*

(Continued)

*Primary Examiner* — Lut Wong
(74) *Attorney, Agent, or Firm* — Weiss & Arons LLP

(57) ABSTRACT

Apparatus and methods for refactoring infrastructure. The methods may include (a) defining parameters of an application landscape. The methods may include (b) stress-testing an application in a simulated environment based on: the parameters; and a simulated input to the application. The methods may include (c) identifying a state of stress of the application based on output of the stress-test. The methods may include (d) repeating (b)-(c) with a different simulated input until the state of stress satisfies a predetermined stochastic threshold. The methods may include (e) providing the state of stress to an upside down reinforcement learning ("UDRL") engine. The methods may include (f) comparing a throughput corresponding to the state of stress to a benchmark throughput. The methods may include (g) redefining the parameters. The methods may include (h) repeating (a)-(f) until a threshold proximity to the benchmark throughput is reached.

21 Claims, 11 Drawing Sheets

(56) References Cited

OTHER PUBLICATIONS

Abid et al ("30 Years of Software Refactoring Research: A Systematic Literature Review" 2020) (Year: 2020).*
Srivastava et al ("Training Agents using Upside-Down Reinforcement Learning" 2020) (Year: 2020).*

* cited by examiner

INFRASTRUCTURE REFACTORING VIA FUZZY UPSIDE DOWN REINFORCEMENT LEARNING

BACKGROUND

Infrastructure refactoring which can be realized through modeling and testing is typically used for determining and enabling migration in various domains. Assessing the refactoring effort of the system based on the requirements, detecting the functional parameters occurring under certain execution conditions, and regulatory violations are typically targets of refactoring analysis. Verifying functional behavior of software systems under migrational conditions, which is called refactoring assessment, to assess robustness and find functional breaking points of the system, is typically involved in migration.

Detecting refactoring requirements may be challenging, particularly for complex software systems. It would be useful to determine critical execution conditions that make the migration bottlenecks happen. Often, the real factors that govern the smoothness of a migration are unknown. Past experience may not be sufficient to identify the factors.

It would therefore be desirable to provide apparatus and methods for infrastructure refactoring.

SUMMARY

Apparatus and methods for refactoring infrastructure are provided. The methods may include (a) defining parameters of an application landscape. The methods may include (b) stress-testing an application in a simulated environment based on: the parameters; and a simulated input to the application. The methods may include (c) identifying a state of stress of the application based on output of the stress-test. The methods may include (d) repeating (b)-(c) with a different simulated input until the state of stress satisfies a predetermined stochastic threshold. The methods may include (e) providing the state of stress to an upside down reinforcement learning ("UDRL") engine. The methods may include (f) comparing a throughput corresponding to the state of stress to a benchmark throughput. The methods may include (g) redefining the parameters. The methods may include (h) repeating (a)-(f) until a threshold proximity to the benchmark throughput is reached.

BRIEF DESCRIPTIONS OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION

Figure 1:
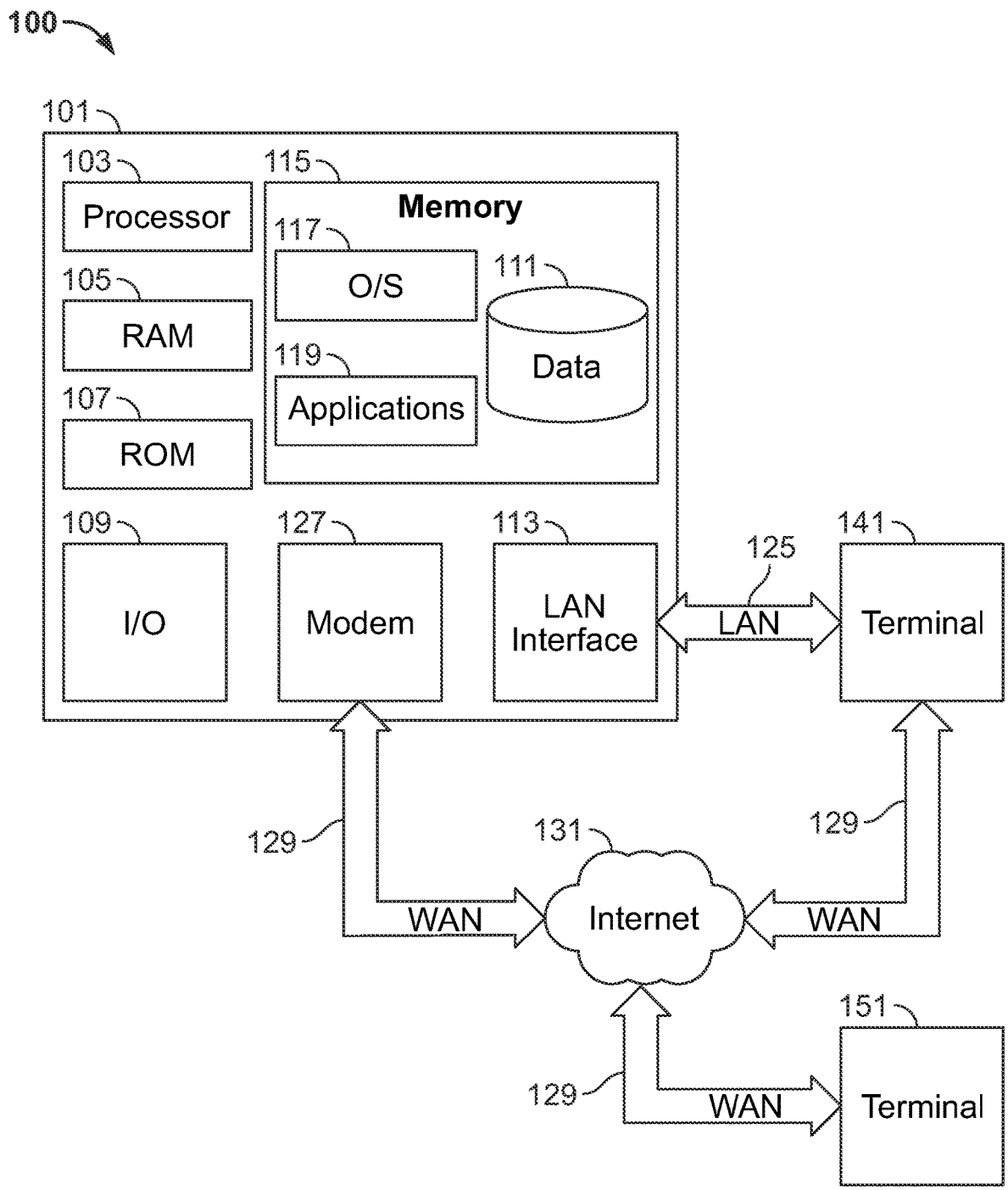
FIG. 1 shows illustrative apparatus that may be used in accordance with principles of the invention.

Although the real factors that govern the success of a migration are not known a priori, certain "rewards" and, conversely, "deductions," may be known. Rewards and deductionsc may function like error values or feedback in the context of neural networks, but they may be based on subjectively chosen application parameters that a user determines to be desirable (reward) or undesirable (penalty). Stability, increased usability and scalability may be stochastically modeled. Based on a stochastic model of application parameters, an upside down reinforcement learning ("UDRL") approach involving meta learning protocols may be used. The approach may (a) define the actions and values of different application parameters based on pre-defined rewards; and (b) identify whether the defined application parameters are adequate to arrive at a converged and optimized set of parameters, viz., a "policy," that are to govern the migration or the application upgrade.

When a new system is to be commissioned or an existing system is to be upgraded, factors such as those listed in Table 1 may be considered before finalizing a new system architecture.

Table 1 lists illustrative architecture factors.

TABLE 1

| Illustrative architecture factors. |
| Illustrative architecture factors |
| --- |
| Cost of Infrastructure |
| Complexity of Deployment |
| List of impacted areas |
| Cost of Maintenance/Support |
| Time to implement |
| Other suitable architecture factors |

Each of the architecture factors may include one or more application parameters. Table 2 lists illustrative application parameters.

TABLE 2

| Illustrative application parameters. |
| Illustrative application parameters |
| --- |
| Cost → Quant Simulator |
| State |
| Movement |
| Complexity → Complexity Gradient |
| Upgrade |
| Impacted areas → Integration analyzer |
| Touchpoints |
| Other suitable application parameters |

Increase throughput may be a goal of an infrastructure change, but increase throughput is not the sole decisor for an enterprise, because there may be one or many offsetting considerations. The apparatus and methods may use probabilistic fuzzification to identify the key considerations—whether offsetting or favorable. The fuzzification may identify the considerations from a universe of application parameters. In this way many combinations of parameters may be evaluated before arriving at a conclusion that an increased throughput associated with a prospective upgrade will serve the enterprises' interests.

The apparatus and methods may include a self-adaptive fuzzy reinforcement learning-based infrastructure analyzer that may output an optimal policy (viz., set of application parameters) for generating refactoring benchmark or estimates without access to real business complexities. The application may learn optimal policy through an initial learning, and may reuse it during a transfer learning phase, while keeping the learning running in the long-term.

The apparatus and methods may involve a combination of two types of optimization convergence reinforcement: (a) meta-reinforcement, which may dynamically identify the parameters required for successful refactoring; and (b) VDRL, which may use predefined rewards (instead of concurrently analytically identified rewards) to accelerate convergence.

The apparatus and methods may include fuzzy state-detection. Fuzzy state detection may provide objective definitions of statistically independent application parameters.

The apparatus and methods may include action-applying and strategy adaptation. These approaches may provide new application parameters to help convergence.

The apparatus and methods may include reward computation. Reward computation may include a priori selection of performance criteria for application parameters. When an application parameter meets or exceeds a corresponding performance criterion, extra weight may be given to the parameter in the optimization process.

The apparatus and methods may involve an application simulator. The application simulator may measure inputs to reinforcement learning through fuzzy controllers. The fuzzy controllers may reduce or eliminate contributions from deterministically related application parameters.

The apparatus and methods may leverage predefined parameters that may be fed into the VDRL engine. Also, the apparatus and methods may identify supplemental parameters in order to optimize the policy through meta reinforcement learning.

The apparatus and methods may process different types of application parameters using different simulation protocols. For example, a quantitative protocol may be used to model monetary or economic considerations; a gradient analyzer may be used to determine gradients for interval data, such as complexity or time; and an integration analyzer may be used to determine functional validation.

The apparatus and methods may involve fuzzy state detection. State detection may include determining a cost, a complexity, scenario of impacted areas, or any other suitable states. State may be time-dependent.

In state detection, the agent may observe a current state of a controlled system—e.g., an application simulator in this case, at discrete time steps. The simulator may include an instance of the application in a simulated environment. The agent may measure the values of quality metrics. The quality metrics may be values of application parameters. The quality metrics may show how much stress the agent has applied to the application in a stress-validation condition. These measurements combined with fuzzy rules in a fuzzy inference engine are used to classify the state of the system into fuzzy states. In reinforcement learning, state space of a system is divided into multiple mutually exclusive states. The system may be considered to be in one distinct state at an given time step. The apparatus and methods may use fuzzy classification as a soft-labeling technique for presenting the values of the metrics expressing the state of the system. Detecting the fuzzy state of the application may be done by fuzzification, fuzzy inference and rule-based modules in connection with stress testing of the application. Stress testing may include, for example, instantiating the application in a simulation environment and monitoring throughput of the application while increasing the frequency, size and complexity of tasks to which the application is asked to respond.

The apparatus and methods may apply upside down meta reinforcement learning: in a training process that takes inputs from fuzzification, associate the inputs with the state, determine the best fit of the simulated performance to desired performance, cross validate application parameter values against the rewards, and send a feedback signal to the simulator to create another clone of data feed. Fuzzification takes an observed "crisp" value of an application parameter from the application landscape and redefines it as a multi-dimensional vector, each element of which represents a closeness to a base parameter. This decouples statistically dependent application parameters and operationally results in a state of stress that is constructed from independent bases that make up the application landscape. The bases may be redefined during iterations of VDRL to better characterize the application's behavior under stress.

Refactoring efficiency may be defined by the collective state of components mentioned above, not independently. Thus, over the iterations, when the VDRL engine realizes that the rewards generated are not compliant with generated actions and differ from expected rewards, it would ask the simulators to send another feed based on a new component (e.g., different options for an operating system) and then the iteration continues to arrive at the convergence.

Rewards may be predefined. The VDRL engine may act as a supervised learning. That is, the VDRL engine may perform the actions based on the fuzzy outputs and components involved, and validate it against the predefined awards. This may lead to faster convergence.

Apparatus and methods for refactoring infrastructure are provided.

The methods may include (a) defining parameters of an application landscape. The methods may include (b) stress-testing an application in a simulated environment based on: the parameters; and a simulated input to the application. The methods may include (c) identifying a state of stress of the application based on output of the stress-test. The methods may include (d) repeating (b)-(c) with a different simulated input until the state of stress satisfies a predetermined stochastic threshold. The methods may include (e) providing the state of stress to an upside down reinforcement learning ("UDRL") engine. The methods may include (f) comparing a throughput corresponding to the state of stress to a benchmark throughput. The methods may include (g) based on the comparison, redefining the parameters. The methods may include (h) repeating (a)-(f) until a threshold proximity to the benchmark throughput is reached.

The application parameters include a cost metric. The application parameters include a complexity gradient. The application parameters include an integration metric.

The VDRL engine may be configured to evaluate a reward based on closeness of a parameter to a predetermined reward value. The reward may be configured to accelerate convergence of a throughput optimization corresponding to the application.

The convergence may include matching a throughput metric to a bracket anchored to the benchmark throughput. A benchmark throughput may be a level of throughput of the application against which theoretical throughputs from the probabilistic fuzzy controller may be compared. The bracket may be a predetermined convergence range. The bracket may have an end that is defined to be equivalent to the benchmark throughput. The throughput metric may correspond to performance of the application in the state of stress.

The methods may include storing the state of stress in a database record. The methods may include storing a feedback policy throughput in the database record.

The application may be a first application. The benchmark throughput may be a first benchmark throughput. The methods may include stress-testing a second application in the simulated environment. The methods may include comparing a throughput of the second application to a benchmark throughput that is defined as the feedback policy throughput.

The methods may include defining a reward value corresponding to an application landscape parameter. The methods may include receiving from an application stress-test agent a first stress-state that: corresponds to performance of an application under test; and includes a landscape parameter having a parameter value. The methods may include, based on a comparison between the reward value and the parameter value, instructing the agent to generate a new stress-state that: corresponds to performance of the application under test; and includes a second application landscape parameter.

The methods may include defining a reward value corresponding to an application landscape parameter; receiving from an application stress-test agent a first stress-state that: corresponds to performance of an application under test; and is based on fuzzified application landscape parameters, each having a fuzzified landscape parameter value; based on a comparison between the reward value and the fuzzified parameter value, instructing the agent to generate a new stress-state that: corresponds to performance of the application under test; and includes a second application landscape parameter.

FIG. 1 is a block diagram that illustrates a computing server 101 (alternatively referred to herein as a "server or computer") that may be used in accordance with the principles of the invention. The server 101 may have a processor 103 for controlling overall operation of the server and its associated components, including RAM 105, ROM 107, input/output ("I/O") module 109, and memory 115.

I/O module 109 may include a microphone, keypad, touchscreen and/or stylus through which a user of server 101 may provide input, and may also include one or more of a speaker for providing audio output and a video display device for providing textual, audiovisual and/or graphical output. Software may be stored within memory 115 and/or other storage (not shown) to provide instructions to processor 103 for enabling server 101 to perform various functions. For example, memory 115 may store software used by server 101, such as an operating system 117, application programs 119, and an associated database 111. Alternatively, some or all of computer executable instructions of server 101 may be embodied in hardware or firmware (not shown).

Server 101 may operate in a networked environment supporting connections to one or more remote computers, such as terminals 141 and 151. Terminals 141 and 151 may be personal computers or servers that include many or all of the elements described above relative to server 101. The network connections depicted in FIG. 1 include a local area network (LAN) 125 and a wide area network (WAN) 129, but may also include other networks.

When used in a LAN networking environment, server 101 is connected to LAN 125 through a network interface or adapter 113.

When used in a WAN networking environment, server 101 may include a modem 127 or other means for establishing communications over WAN 129, such as Internet 131.

It will be appreciated that the network connections shown are illustrative and other means of establishing a communications link between the computers may be used. The existence of any of various well-known protocols such as TCP/IP, Ethernet, FTP, HTTP and the like is presumed, and the system may be operated in a client-server configuration to permit a user to retrieve web pages from a web-based server. Any of various conventional web browsers may be used to display and manipulate data on web pages.

Additionally, application program 119, which may be used by server 101, may include computer executable instructions for invoking user functionality related to communication, such as email, short message service (SMS), and voice input and speech recognition applications.

Computing server 101 and/or terminals 141 or 151 may also be mobile terminals including various other components, such as a battery, speaker, and antennas (not shown). Terminal 151 and/or terminal 141 may be portable devices such as a laptop, tablet, smartphone or any other suitable device for receiving, storing, transmitting and/or displaying relevant information.

Any information described above in connection with database 111, and any other suitable information, may be stored in memory 115. One or more of applications 119 may include one or more algorithms that may be used to perform the functions of one or more of an infrastructure stress-testing environment, a cost model, a complexity model, a impacted area model, a probabilistic fuzzy controller and a VDRL engine, and perform any other suitable tasks.

The apparatus and methods may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The apparatus and methods may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
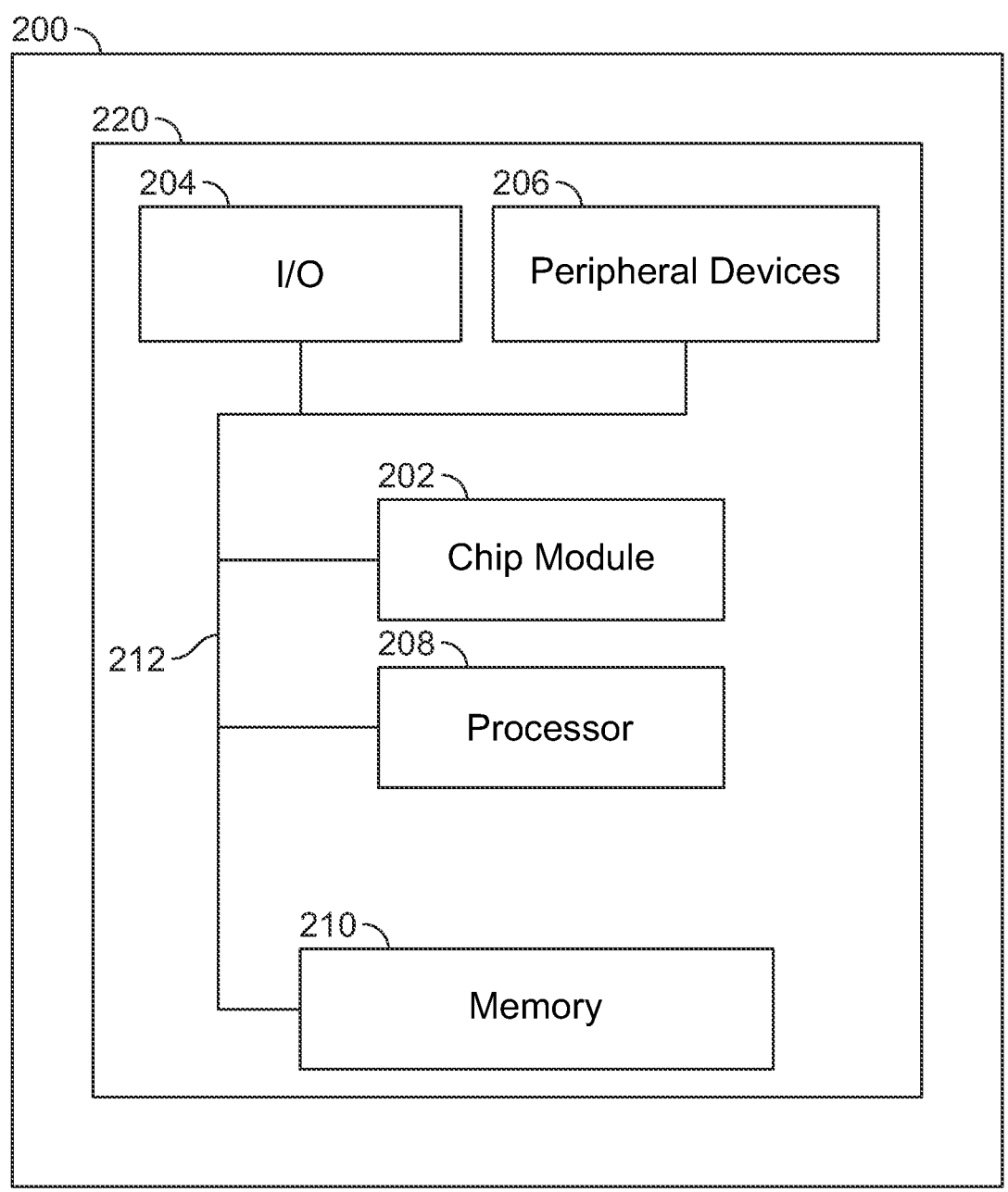
FIG. 2 shows illustrative apparatus that may be used in accordance with principles of the invention.

FIG. 2 shows illustrative apparatus 200 that may be configured in accordance with the principles of the invention.

Apparatus 200 may be a computing machine. Apparatus 200 may include one or more features of the apparatus that is shown in FIG. 1.

Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable encoded media or devices; peripheral devices 206, which may include counter timers, real-time timers, power-on reset generators or any other suitable peripheral devices; logical processing device 208, which may solve equations and perform other methods described herein; and machine-readable memory 210.

Machine-readable memory 210 may be configured to store in machine-readable data structures associated with application parameters and stress-states and any other suitable information or data structures.

Components 202, 204, 206, 208 and 210 may be coupled together by a system bus or other interconnections 212 and may be present on one or more circuit boards such as 220. In some embodiments, the components may be integrated into a single chip.

The chip may be silicon-based.

Figure 3:
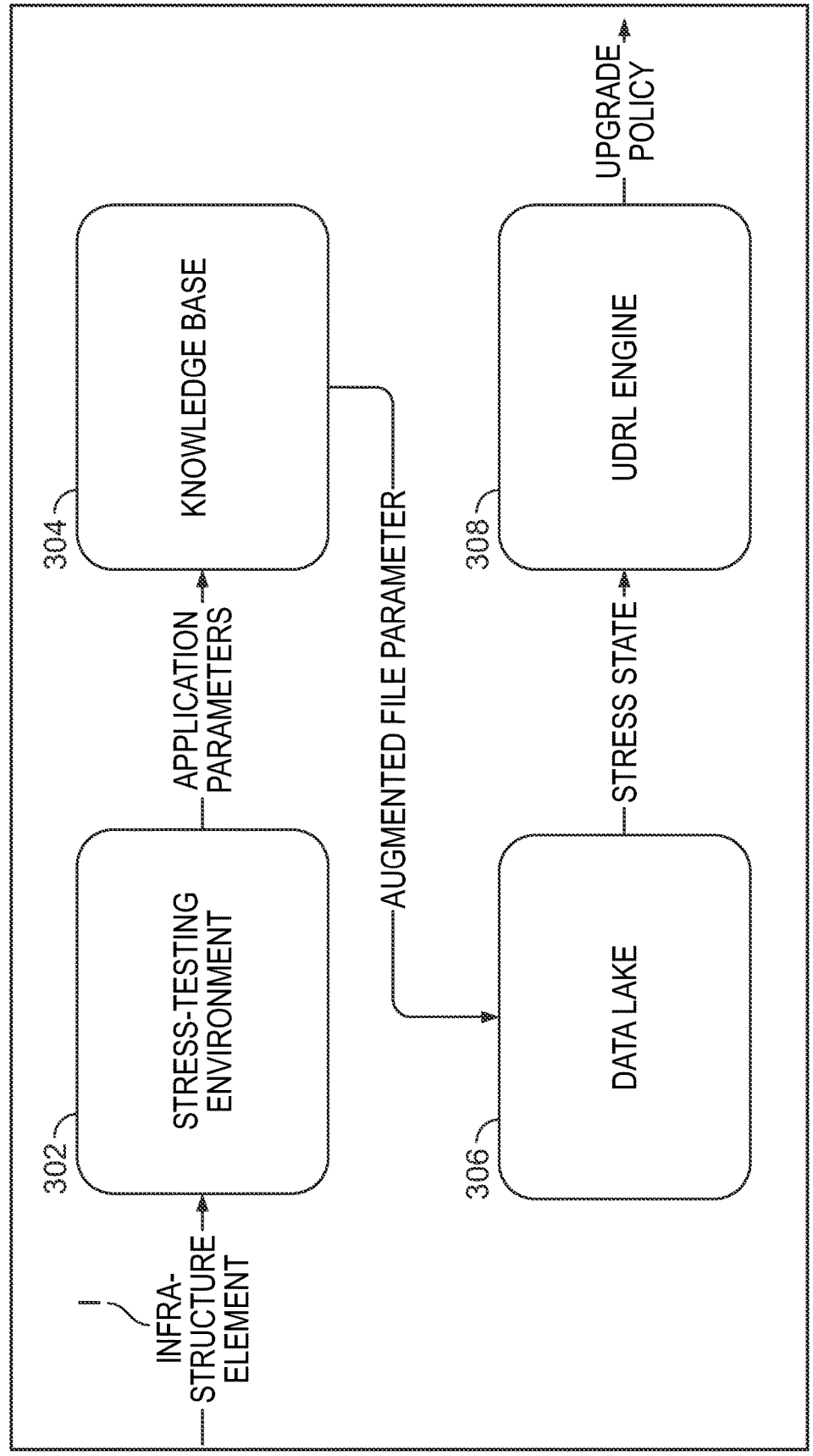
FIG. 3 shows an illustrative schema in accordance with principles of the invention.

FIG. 3 shows illustrative architecture 300 for enterprise infrastructure refactoring. Architecture 300 may include stress-testing environment 302. Architecture 300 may include knowledge base 304. Architecture 300 may include data lake 306. Architecture 300 may include UDRL engine 308. Infrastructure element I may be input into stress-testing environment 302. Element I may include a software application. Element I may include a hardware implementation. Stress-testing environment 302 may apply stressors to element I. Stress-testing environment 302 may gauge behaviors of element I. The behaviors may be responses to the stressors. The behaviors may be quantified as application parameters. The application parameters may be transmitted to knowledge base 304. Knowledge base 304 may identify additional parameters that relate to the application parameters. For example, if a parameter is "hard-disc access rate," knowledge base may identify software and hardware solutions that mitigate consequences of high hard-disc access rates. The solutions may be based on knowledge from past enterprise infrastructure refactoring. Application landscape 306 may determine a stress-state based on the augmented parameter file. The stress-state may be input into a UDRL engine. The UDRL engine may identify application parameters to quantify in subsequent stress-testing to provide a robust stochastic state of stress corresponding to a desired performance level of the application. When the desired performance level is reached, the UDRL engine may report the stress-state in the form of an upgrade policy. The upgrade policy may include metrics for an infrastructure element that is to replace infrastructure element I.

Figure 4:
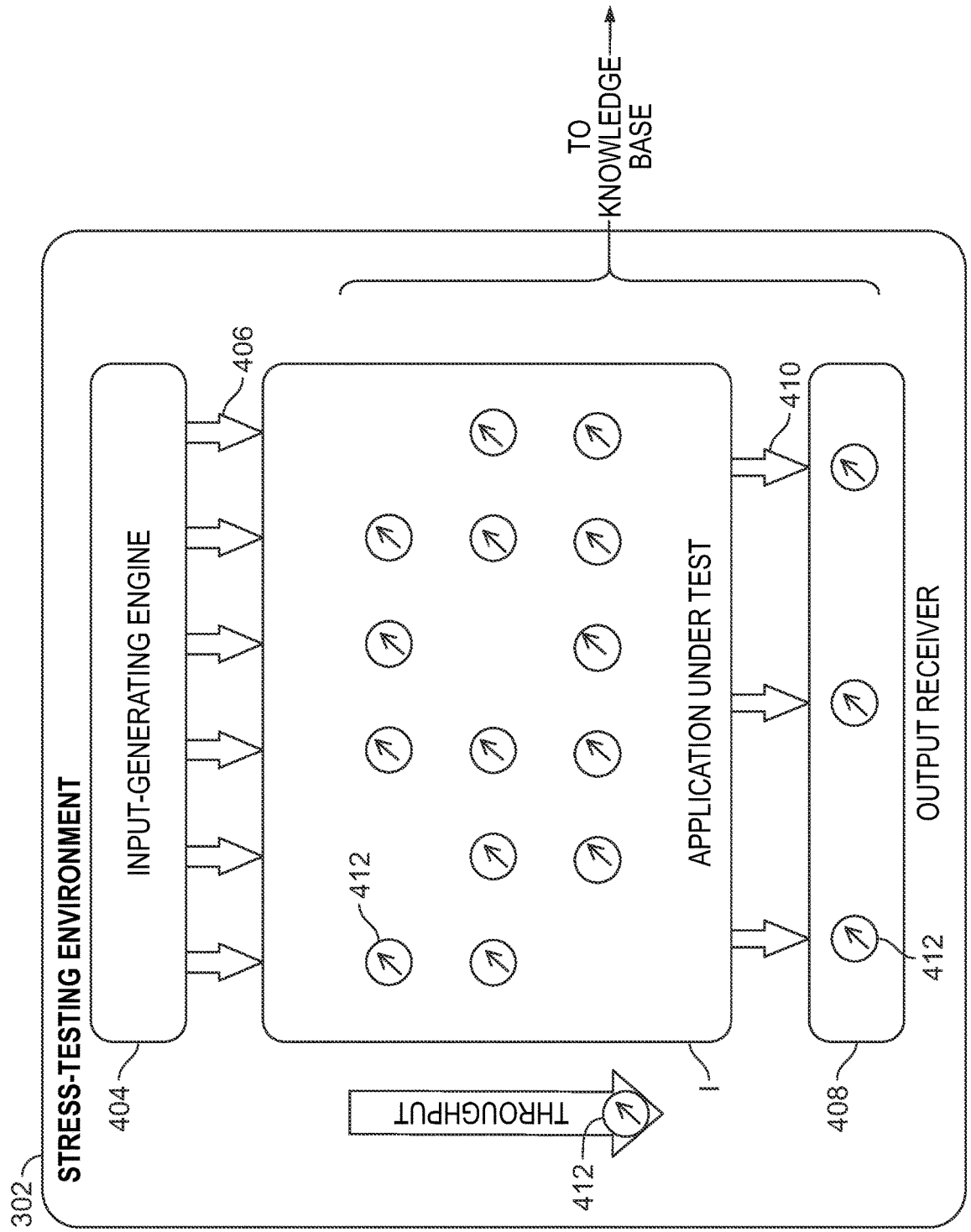
FIG. 4 shows an illustrative schema in accordance with principles of the invention.

FIG. 4 shows illustrative stress-testing environment 302. Infrastructure element I ("Application Under Test") is instantiated in environment 304. Input-generating engine 404 may generate inputs 406 that are applied to element I. Output receiver 408 may receive outputs 410 from element I. Application parameters 410 may be measured. Application parameters 412 may be measured directly from "ports" into element I. Application parameters 412 corresponding to outputs 410 may be measured by output receiver 408. Stress-testing environment 302 may measure throughput (e.g., outputs 410 per unit time as a function of rate of inputs 408). Application parameters 412 may include throughput.

Outputs 412 may be transmitted to a knowledge base.

Figure 5:
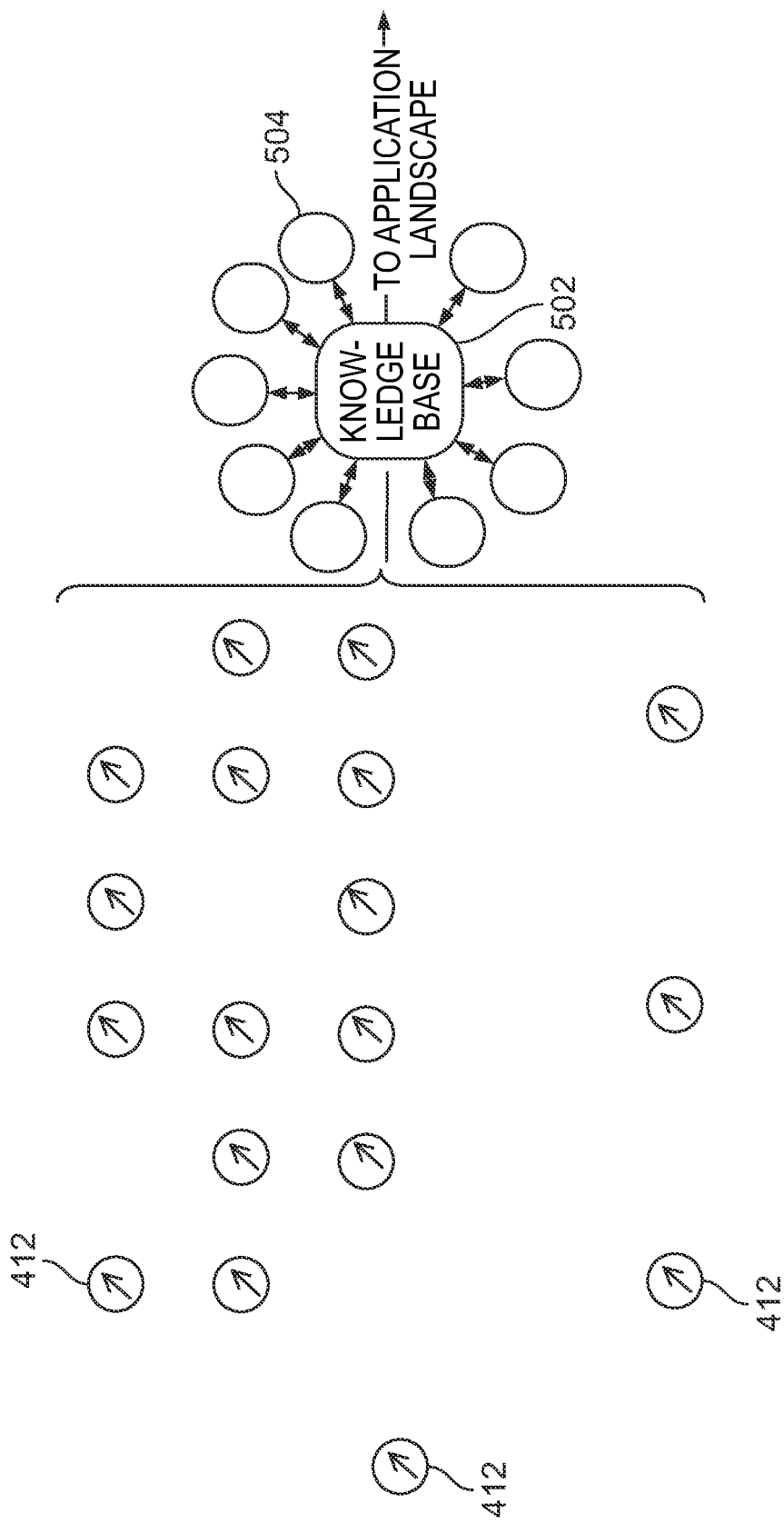
FIG. 5 shows an illustrative schema in accordance with principles of the invention.

FIG. 5 shows illustrative knowledge base 502. Knowledge base 504 may associate application parameters 412 with supplemental parameters from knowledge ponds 504. Knowledge ponds 504 may be stocked with cost information, system complexity information, coordinated system integration information, and any other suitable information. The supplemental parameters may be added to the application parameters in the augmented parameter file and transmitted to the application landscape.

Figure 6:
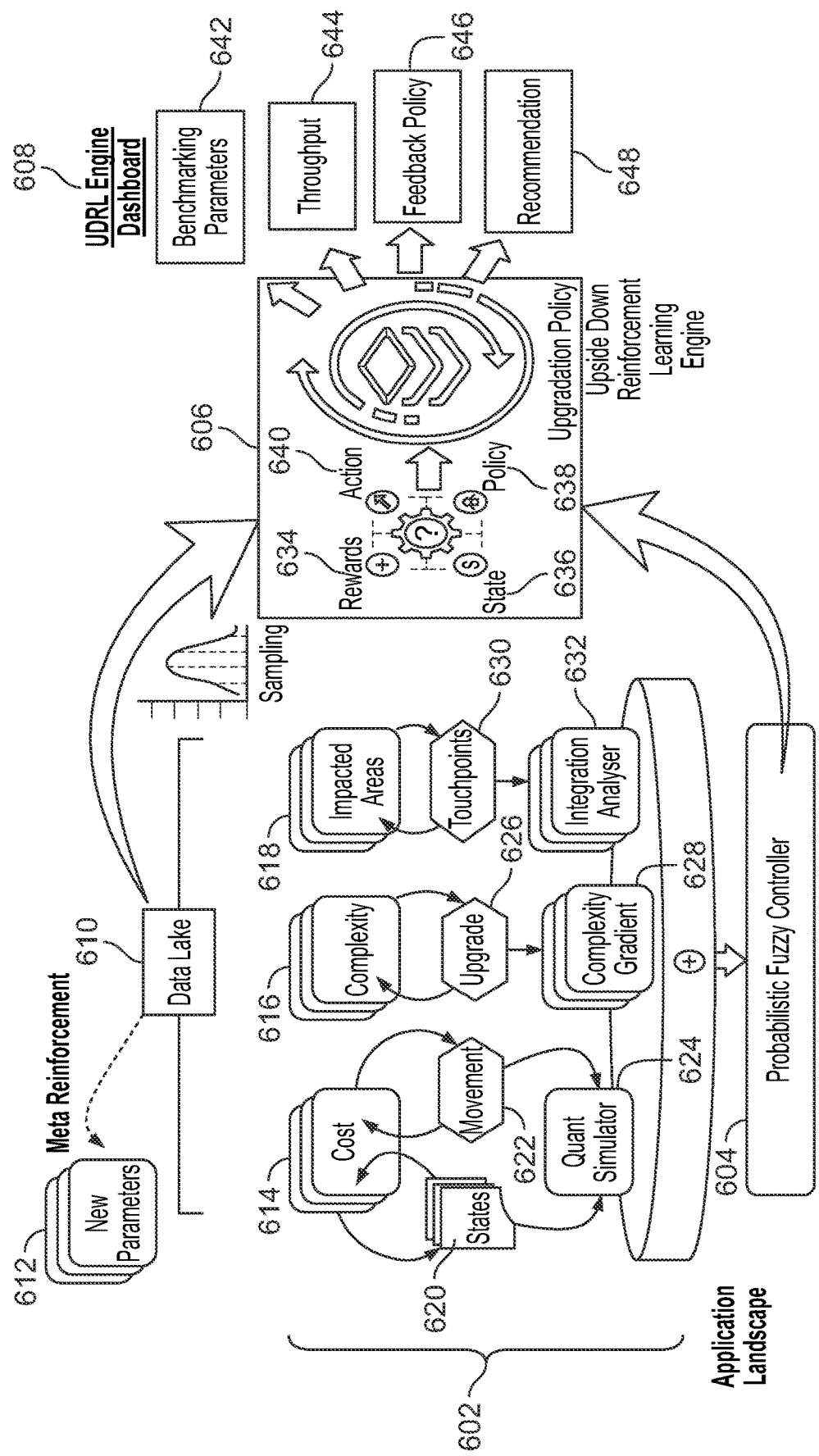
FIG. 6 shows an illustrative schema in accordance with principles of the invention.

FIG. 6 shows illustrative application landscape 602, illustrative probabilistic fuzzy controller 604, illustrative upside down reinforcement learning engine 606 and illustrative VDRL engine dashboard 608.

Application landscape 602 may reside in data lake 610. New parameters 612 may enter from knowledge base 502 based requirements for model convergence, on an acceptable throughput level, in upside down reinforcement learning engine 606.

Data lake 610 may support the instantiation of models that simulate different infrastructure refactoring scenarios. Data lake 610 may support cost model 614, complexity model 616 and impacted areas model 618.

Cost model 614 may quantify refactoring cost based on the augmented parameter file. The cost may correspond to a throughput. Cost model 614 may include state cost estimation module 620. State cost module 614 may provide a cost of a system configuration corresponding to a state. The cost may include a purchase cost, an installation cost, a maintenance cost, an administration cost or any other suitable cost. Cost model 614 may include movement cost estimation module 622. Movement cost module 622 may provide a cost of moving to a new infrastructural element. The cost may be a physical moving cost, a data transfer or any other suitable moving cost. Cost model 614 may include quant simulator 624. Quant simulator 624 may receive output from state cost module 614 and movement cost module 622. Quant simulator may estimate an actual cost associated with the infrastructure refactoring. The estimate cost may be associated with a throughput.

Complexity module 616 may quantify a complexity of a refactoring scenario. Upgrade module 624 may provide a quantitative complexity of an upgraded refactoring scenario. Complexity gradient module 628 may quantify a change in complexity corresponding to a trade-off between one refactoring scenario and another.

Impacted areas module 618 may identify "coordinated" systems—those systems having an interface with, interdependent with, or exchanging information with the infrastructure element. Touchpoints module 630 may identify the individual channels of interaction between the infrastructure element and the coordinated systems. Integration analyzer 632 may determine compatibility requirements corresponding to the channels.

Cost model 614, complexity model 616 and impacted areas model 618 may detect a state of stress. A supervisory agent observes the current state of infrastructure element I in stress-testing environment 302 at discrete time steps. The agent may measure the values of the application parameters. The agent then uses the models, which operate with fuzzy rules in a fuzzy inference engine, to classify the state of infrastructure element I into fuzzy states.

Probabilistic fuzzy controller 604 may require that state conform to a minimum threshold of stochastic degree (e.g., a degree of randomness or statistical independence defined by the state). When such a level of stochastic degree is achieved, the state may be transmitted to UDRL engine 606. The application parameters may be transmitted to UDRL engine 606.

UDRL engine 606 may apply rewards 634 to elements of state 636 that produce desired effects on policy 638. UDRL engine may iteratively evaluate throughput based on supervised learning about different actions driven by stress-testing environment 302 until throughput reaches a desired predetermined value. If convergence is too slow, or if rewards are not triggered, UDRL engine 606 may send a feedback signal to stress-testing environment 302 to re-do the stress test with a different application parameter. In this way, UDRL engine 606 may identify key application parameters without a priori selection of the application parameters to consider.

UDRL engine dashboard 608 may show benchmarking parameters 642, throughput 644, feedback policy 646 and recommendation 648. Benchmarking parameters 642 may be preselected to configure UDRL engine 606 to converge on a desired parameter, for example, throughput. Throughput 644 may be the current throughput for a state of stress. Feedback policy 646 may include a log of stress-states or application parameters, and values thereof, that are associated with the current state of stress. Recommendation 648 may include suggestions for policies that may improve other infrastructure elements in the enterprise that have features similar to infrastructure element I.

Figure 7:
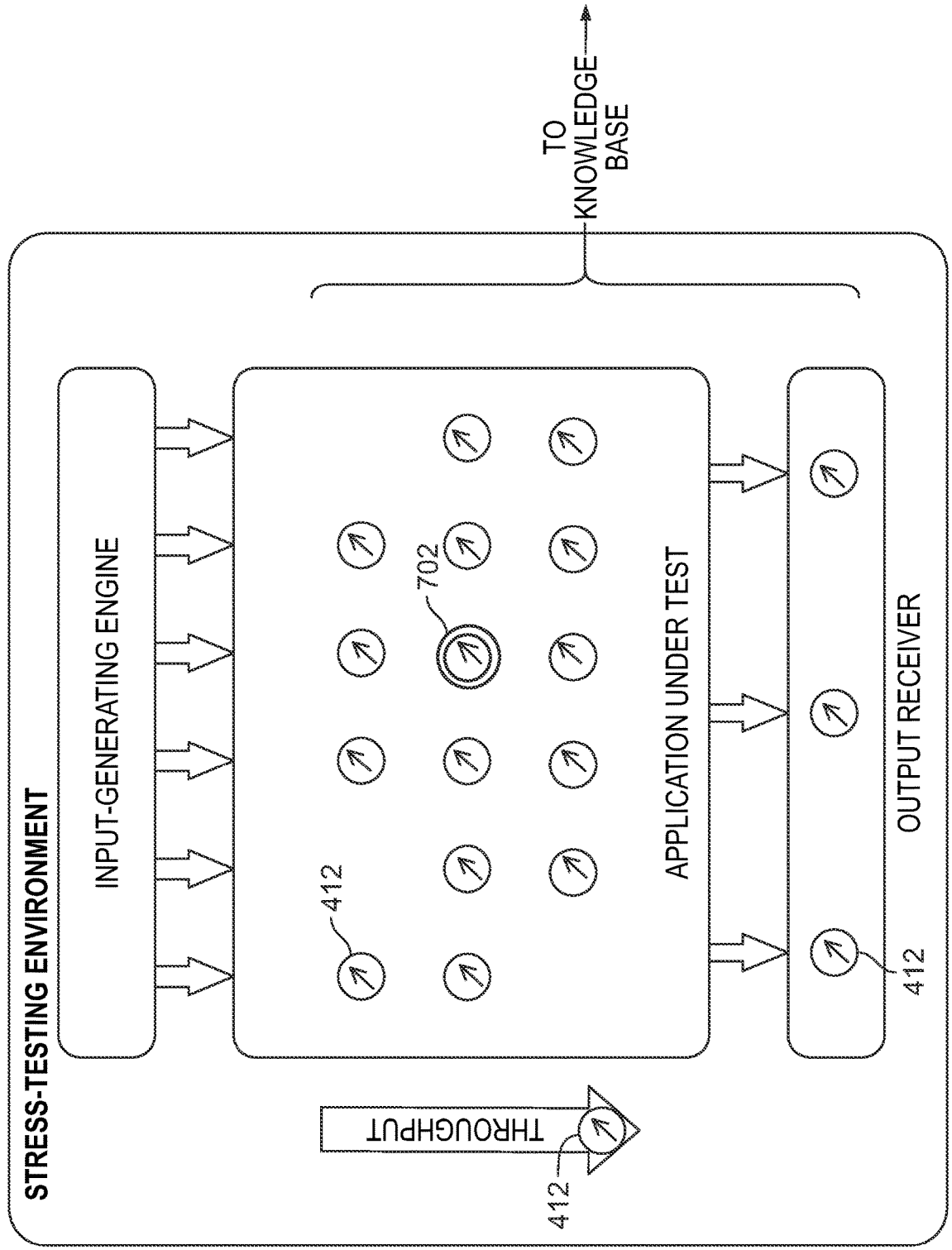
FIG. 7 shows an illustrative schema in accordance with principles of the invention.

FIG. 7 shows stress-testing environment 302 after receipt of a feedback signal from VDRL engine 606. Stress-testing environment 302 now includes application parameter 702. Stress-testing environment 302 may run a stress-test, on infrastructure element I, that includes application parameter 702.

Figure 8:
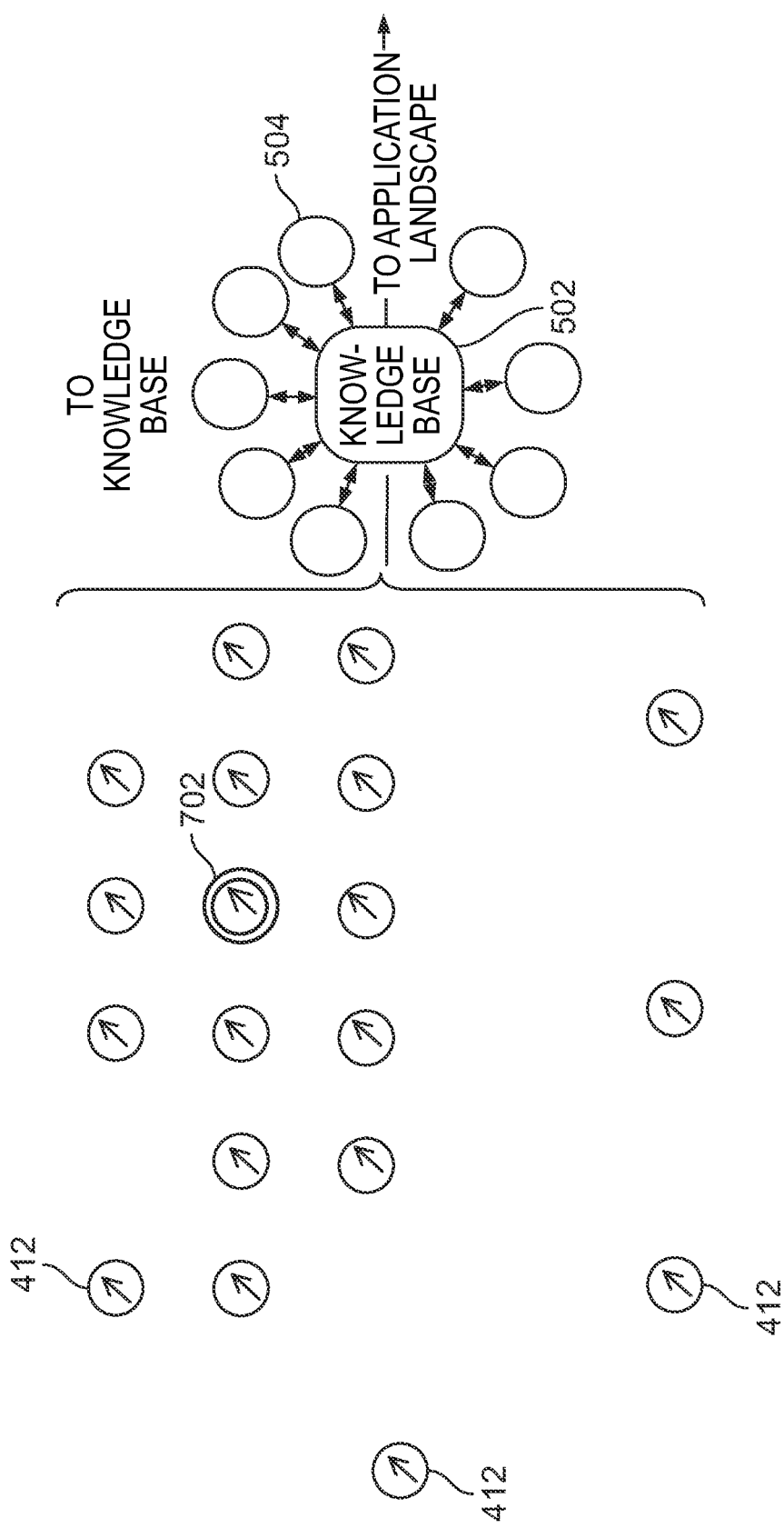
FIG. 8 shows an illustrative schema in accordance with principles of the invention.

FIG. 8 shows application parameter 702 in the data flow to knowledge base 502.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

For the sake of illustration, the steps of the illustrated processes will be described as being performed by a "system." A "system" may include one or more of the features of the apparatus and schema that are shown in FIG. 1-FIG. 8 and/or any other suitable device or approach. The "system" may include one or more means for performing one or more of the steps described herein.

The steps of methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative process may include steps shown in connection with another illustrative process.

Figure 9:
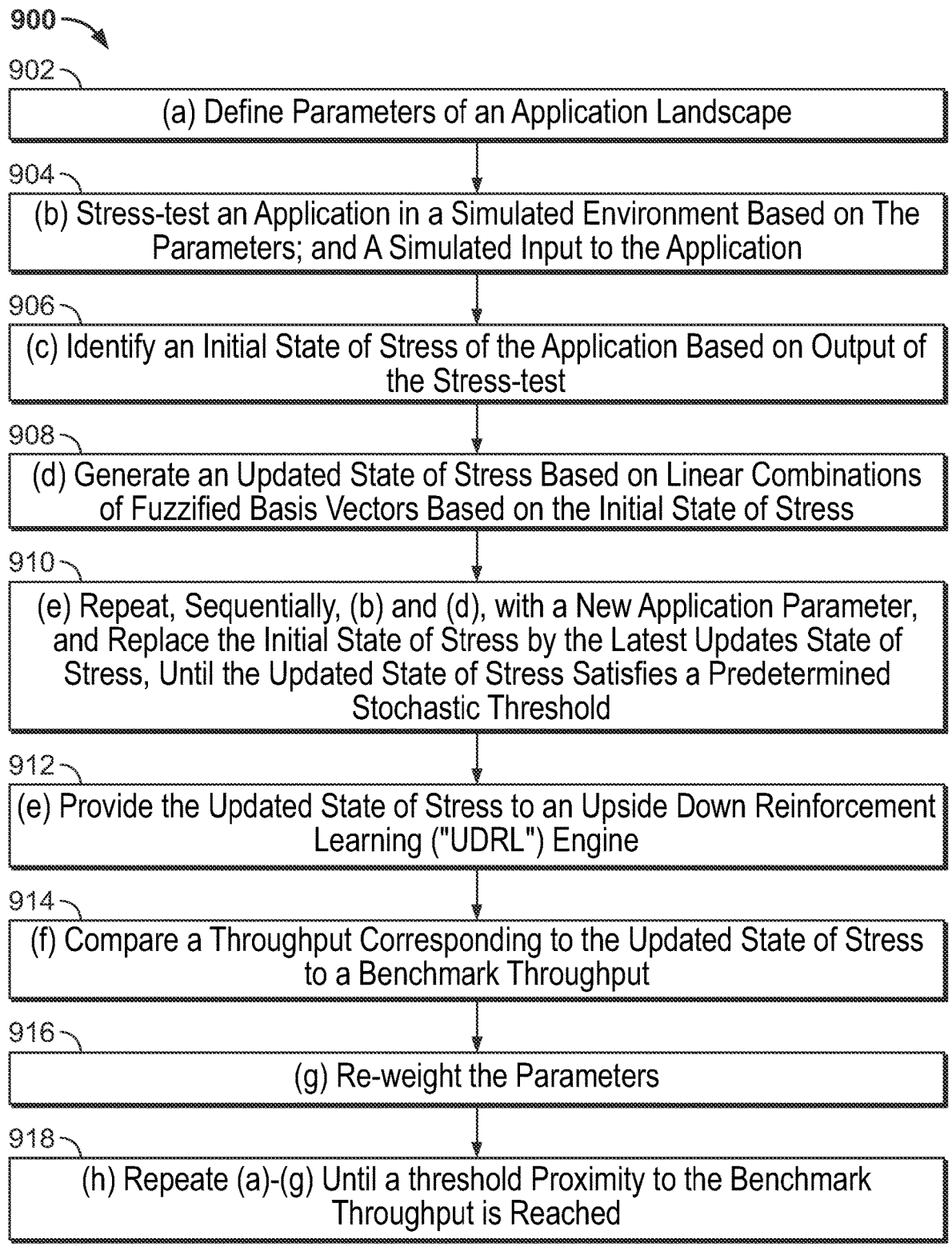
FIG. 9 shows illustrative steps of a process in accordance with principles of the invention.

FIG. 9 shows illustrative steps of process 900. Process 900 may begin at step 902. At step 902, the system may (a) define parameters of an application landscape. At step 904, the system may (b) stress-test an application in a simulated environment based on the parameters and a simulated input to the application. At step 906, the system may (c) identify an initial state of stress of the application based on output of the stress-test. At step 908, the system may (d) generate an updated state of stress based on linear combinations of fuzzified basis vectors based on the initial state of stress. At step 910, the system may (e) repeat, sequentially, (b) and (d), with a new application parameter, and the initial state of stress may be replaced by the latest updated state of stress, until the updated state of stress satisfies a predetermined stochastic threshold. At step 912, the system may (e) provide the updated state of stress to an upside down reinforcement learning ("UDRL") engine. At step 914, the system may (f) compare a throughput corresponding to the updated state of stress to a benchmark throughput. At step 916, the system may (g) re-weight the parameters. At step 918, the system may (h) repeat (a)-(g) until a threshold proximity to the benchmark throughput is reached.

Figure 10:
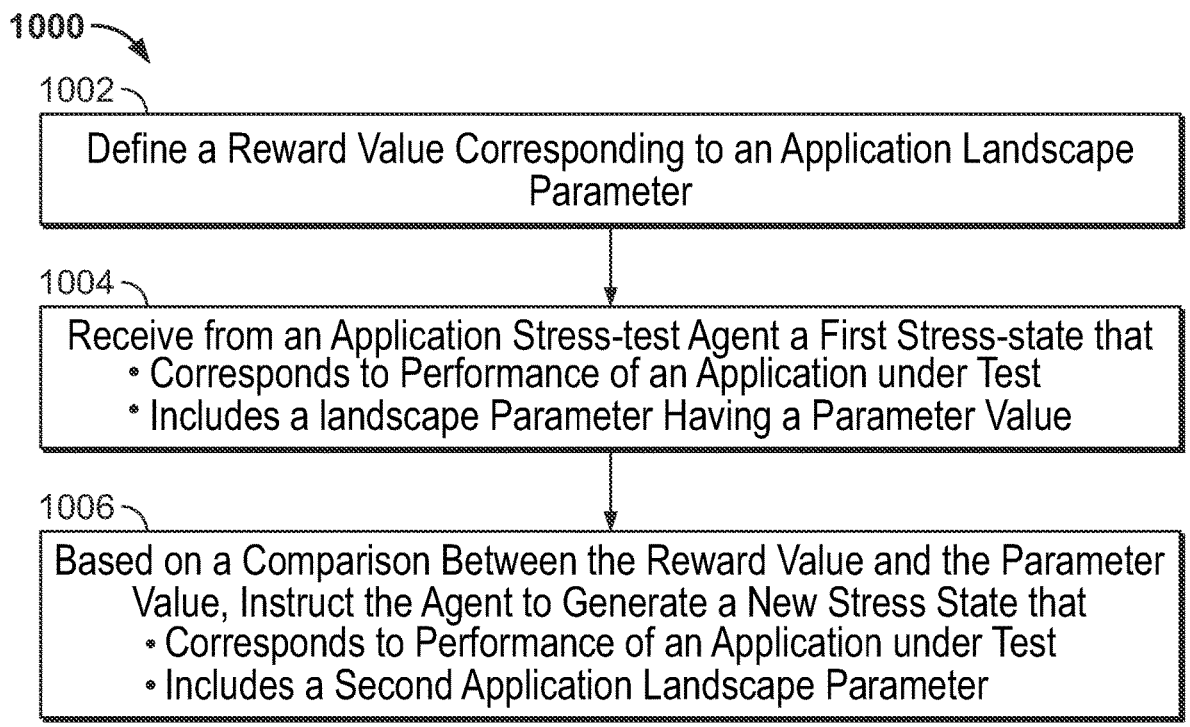
FIG. 10 shows illustrative steps of a process in accordance with principles of the invention.

FIG. 10 shows illustrative steps of process 1000. Process 1000 may begin at step 1002. At step 1002, the system may define a reward value corresponding to an application landscape parameter. At step 1004, the system may receive from an application stress-test agent a first stress-state that corresponds to performance of an application under test and includes a landscape parameter having a parameter value. At step 1006, the system may, based on a comparison between the reward value and the parameter value, instruct the agent to generate a new stress-state that corresponds to performance of the application under test, and includes a second application landscape parameter.

Figure 11:
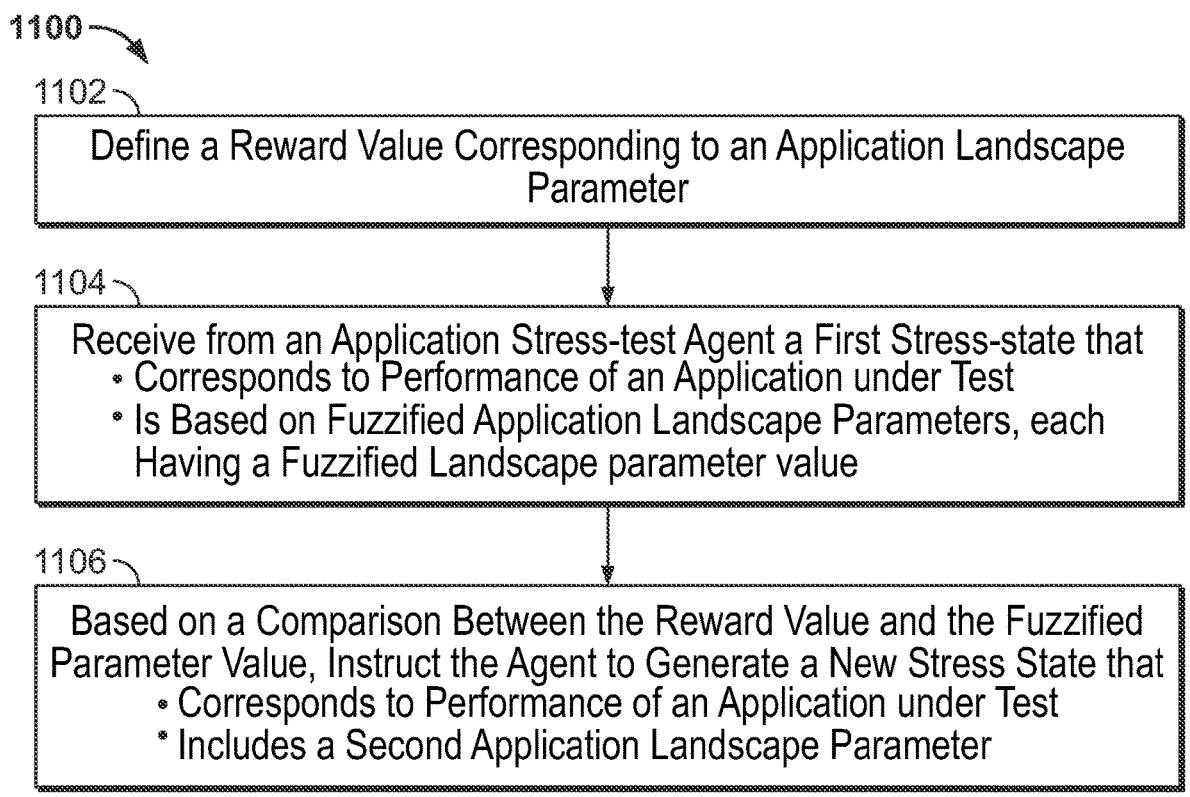
FIG. 11 shows illustrative steps of a process in accordance with principles of the invention.

FIG. 11 shows illustrative steps of process 1100. Process 1100 may begin at step 1102. At step 1102, the system may define a reward value corresponding to an application landscape parameter. At step 1104, the system may receive from an application stress-test agent a first stress-state that corresponds to performance of an application under test, and is based on fuzzified application landscape parameters, each having a fuzzified landscape parameter value. At step 1106, the system may, based on a comparison between the reward value and the fuzzified parameter value, instructing the agent to generate a new stress-state that corresponds to performance of the application under test, and includes a second application landscape parameter.

As will be appreciated by one of skill in the art, the invention described herein may be embodied in whole or in part as a method, a data processing system, or a computer program product. Accordingly, the invention may take the form of an entirely hardware embodiment, an entirely software embodiment or an embodiment combining software, hardware and any other suitable approach or apparatus.

Thus, methods and apparatus for refactoring infrastructure have been provided. Persons skilled in the art will appreciate that the present invention may be practiced by other than the described embodiments, which are presented for purposes of illustration rather than of limitation.

What is claimed is:

1. A method for improving application throughput by refactoring infrastructure, the method comprising:
   (a) defining a set of parameters of an application landscape;
   (b) stress-testing an application in a simulated environment based on:
      the parameters; and
      a simulated input to the application;
      the stress-testing comprising (1) generating a simulated hardware environment, (2) instantiating the application in the simulated hardware environment, (3) porting in the application landscape parameters, and (4) detecting an output comprising an application throughput;
   (c) identifying an initial state of stress of the application based on output of the stress-test;

(d) generating an updated state of stress based on linear combinations of fuzzified basis vectors based on the initial state of stress, the fuzzified basis vectors based on the application landscape parameters;

(e) repeating, sequentially, (b) and (d), with a new application parameter in the set of parameters, and the initial state of stress replaced by the latest updated state of stress, until the updated state of stress satisfies a predetermined stochastic threshold;

(f) providing the updated state of stress to an upside down reinforcement learning ("UDRL") engine;

(g) comparing a throughput corresponding to the updated state of stress to a benchmark throughput;

(h) re-weighting the parameters; and (i) repeating (a)-(i) until a threshold proximity to the benchmark throughput is reached and outputting a set of parameters and weights associated with the benchmark throughput.

2. The method of claim 1 wherein the application parameters include:
a cost metric;
a complexity gradient; and
an integration metric.

3. The method of claim 1 wherein:
the UDRL engine is configured to evaluate a reward based on closeness of a parameter to a predetermined reward value; and
the reward is configured to accelerate convergence of a throughput optimization corresponding to the application.

4. The method of claim 3 wherein the convergence includes matching a throughput metric to a bracket anchored to the benchmark throughput, the throughput metric corresponding to performance of the application in the updated state of stress.

5. The method of claim 1 further comprising storing the updated state of stress in a database record.

6. The method of claim 5 further comprising storing a feedback policy throughput in the database record.

7. The method of claim 6 further comprising, when the application is a first application, and the benchmark throughput is a first benchmark throughput:
stress-testing a second application in the simulated environment; and
comparing a throughput of the second application to a benchmark throughput that is defined as feedback policy throughput.

8. A method for improving application throughput by refactoring infrastructure, the method comprising:
defining a reward value corresponding to a first application landscape parameter and a reward value corresponding to a second application landscape parameter;
receiving from an application stress-test agent a first stress-state that:
corresponds to performance of an application under test, the test comprising generating a simulated hardware environment, instantiating the application in the simulated hardware environment, porting in the first application landscape parameter, and detecting an output comprising a first application throughput; and
includes the first application landscape parameter having a parameter value;
based on a comparison between the reward value and the parameter value, instructing the agent to generate a new stress-state that:
corresponds to performance of the application under test, the test comprising generating a simulated hardware environment, instantiating the application in the simulated hardware environment, porting in the second application landscape parameter, and detecting an output comprising a second application throughput; and
includes the second application landscape parameter;
the new stress-state based on linear combinations of fuzzified basis vectors, the fuzzified basis vectors based on the first application landscape parameter.

9. The method of claim 8 wherein the application parameter includes:
a cost metric;
a complexity gradient; and
an integration metric.

10. The method of claim 8 further comprising an upside down reinforcement learning ("UDRL") engine that is configured to evaluate a reward based on closeness of a parameter to a predetermined reward value;
wherein the reward is configured to accelerate convergence of a throughput optimization corresponding to the application.

11. The method of claim 10 wherein the convergence includes matching a throughput metric to a bracket anchored to a benchmark throughput, the throughput metric corresponding to performance of the application in the stress-state.

12. The method of claim 11 further comprising storing the stress-state in a database record.

13. The method of claim 12 further comprising storing a feedback policy throughput in the database record.

14. The method of claim 13 further comprising, when the application is a first application, and the benchmark throughput is a first benchmark throughput:
stress-testing a second application in a simulated environment; and
comparing a throughput of the second application to a benchmark throughput that is defined as feedback policy throughput.

15. A method for improving application throughput by refactoring infrastructure, the method comprising:
defining a reward value corresponding to an application landscape parameter;
receiving from an application stress-test agent a first stress-state that:
corresponds to performance of an application under test, the test comprising generating a simulated hardware environment, instantiating the application in the simulated hardware environment, porting in the application landscape parameter, and detecting an output comprising an application throughput; and
is based on fuzzified application landscape parameters, each having a fuzzified landscape parameter value;
based on a comparison between the reward value and a fuzzified parameter value, the comparison comprising linear combinations of fuzzified basis vectors, instructing the agent to generate a new stress-state that:
corresponds to performance of the application under test; and
includes a second application landscape parameter.

16. The method of claim 15 wherein the application parameters include:
a cost metric;
a complexity gradient; and
an integration metric.

17. The method of claim 15 further comprising an upside down reinforcement learning ("UDRL") engine that is configured to evaluate a reward based on closeness of a parameter to a predetermined reward value;
   wherein the reward is configured to accelerate convergence of a throughput optimization corresponding to the application.

18. The method of claim 17 wherein the convergence includes matching a throughput metric to a bracket anchored to a benchmark throughput, the throughput metric corresponding to performance of the application in the new stress-state.

19. The method of claim 18 further comprising storing the new stress-state in a database record.

20. The method of claim 19 further comprising storing a feedback policy throughput in the database record.

21. The method of claim 20 further comprising, when the application is a first application, and the benchmark throughput is a first benchmark throughput:
   stress-testing a second application in a simulated environment; and
   comparing a throughput of the second application to a benchmark throughput that is defined as feedback policy throughput.

* * * * *